(12) United States Patent
Okada et al.

(10) Patent No.: US 6,509,938 B2
(45) Date of Patent: Jan. 21, 2003

(54) LIQUID CRYSTAL DISPLAY VIDEO PROJECTOR AND METHOD OF REPAIRING SAME

(75) Inventors: Takehiro Okada, Osaka (JP); Shozo Aono, Osaka (JP); Masanari Hashimukai, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 52 days.

(21) Appl. No.: 09/870,137

(22) Filed: May 30, 2001

(65) Prior Publication Data

US 2002/0015115 A1 Feb. 7, 2002

(30) Foreign Application Priority Data

May 30, 2000 (JP) .......................................... 2000-159840

(51) Int. Cl.[7] ..................... G02F 1/1335; G02F 1/1333; G03B 21/14
(52) U.S. Cl. ................................. 349/5; 349/7; 349/58; 353/119
(58) Field of Search ....................... 349/5–9, 58; 353/31, 353/33, 34, 20, 119

(56) References Cited

U.S. PATENT DOCUMENTS

| | | | | |
|---|---|---|---|---|
| 4,148,569 A | * | 4/1979 | Suzaki et al. ................ 352/140 |
| 5,978,054 A | * | 11/1999 | Fujimori ........................ 349/60 |
| 6,343,864 B1 | * | 2/2002 | Tajiri .............................. 349/9 |
| 6,361,171 B1 | * | 3/2002 | Ejiri et al. .................... 348/744 |
| RE37,836 E | * | 9/2002 | Fujimori et al. ............. 353/119 |

FOREIGN PATENT DOCUMENTS

EP      1146383 A1 * 10/2001 ............. G02F/1/13

* cited by examiner

Primary Examiner—William L. Sikes
Assistant Examiner—Tarifur R. Chowdhury
(74) Attorney, Agent, or Firm—RatnerPrestia

(57) ABSTRACT

A light source, a color separator, a plurality of liquid crystal panels, a polarizing plate, a color synthesizing optical unit, and a projecting lens are disposed. The color synthesizing optical unit includes an X prism, a bonding base, a panel retaining member, and a panel installing member. The panel retaining member is fixed on the bonding base. The liquid crystal panels and the polarizing plate are installed on the panel installing member. The panel installing member can be separated from the panel retaining member. By this configuration, deviation of the convergence can be prevented with respect to the liquid crystal panels. Further, in practical use, it is easy to replace or repair the liquid crystal panel or the polarizing plate.

16 Claims, 6 Drawing Sheets

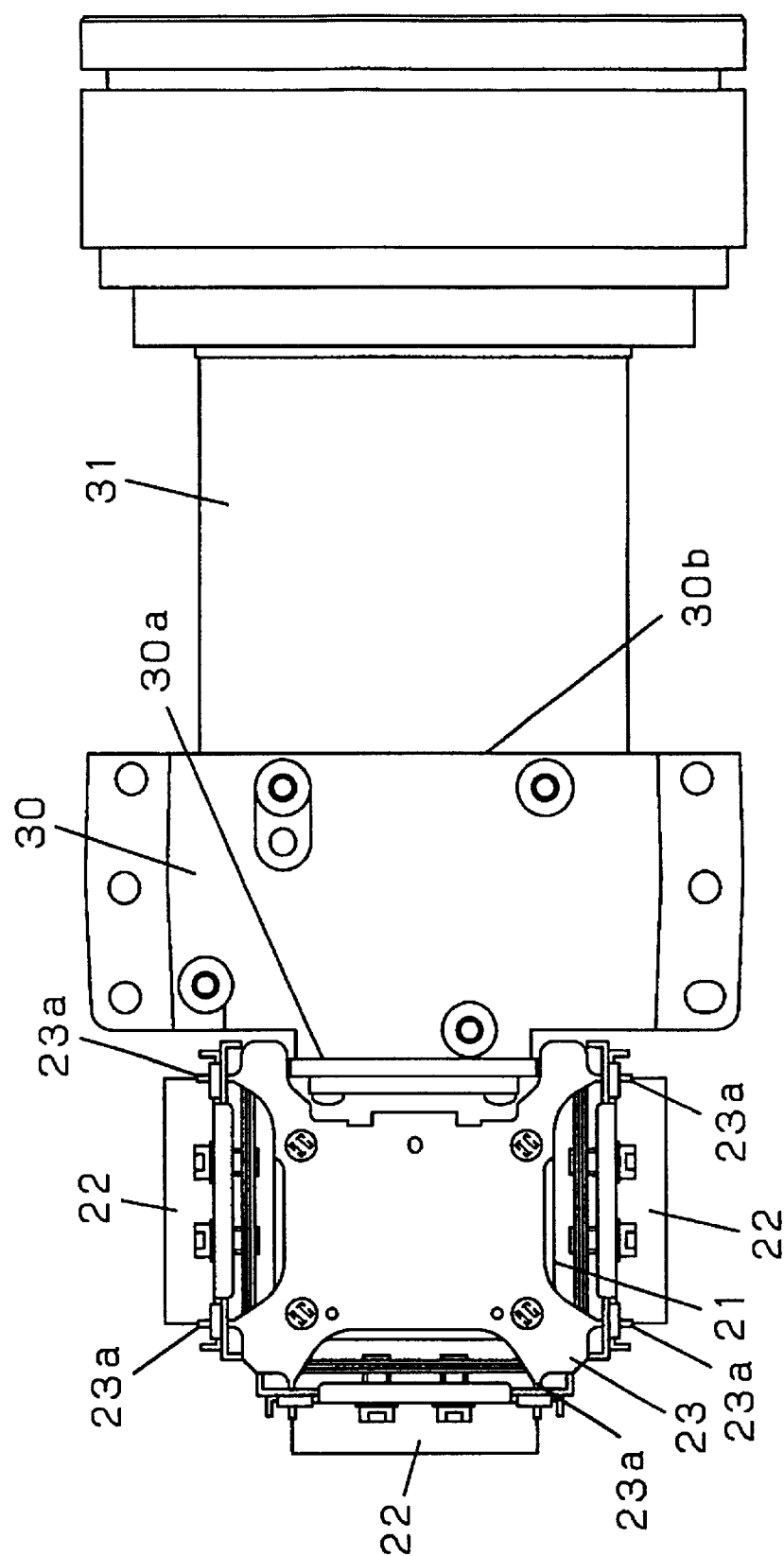

Fig. (a)
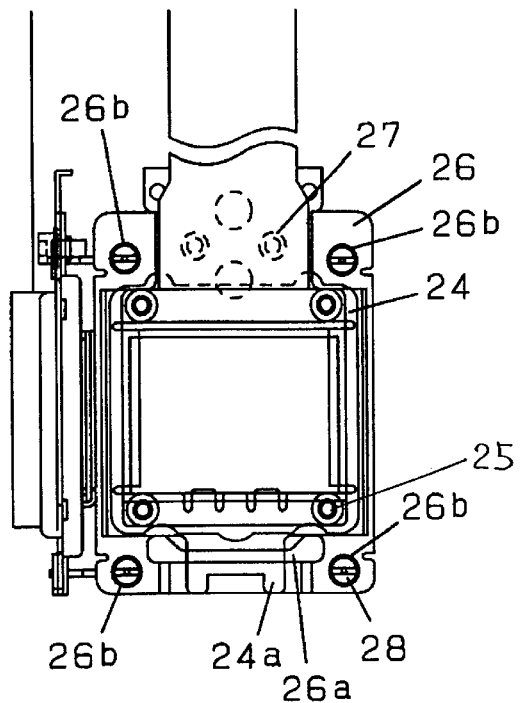
Fig. 4(b)
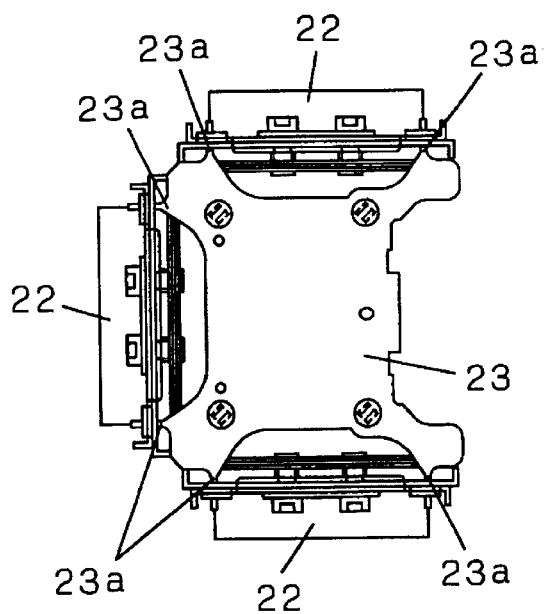

LIQUID CRYSTAL DISPLAY VIDEO PROJECTOR AND METHOD OF REPAIRING SAME

FIELD OF THE INVENTION

The present invention relates to a liquid crystal display video projector to enlarge and project the images of liquid crystal panels or like panels, and more particularly, to a liquid crystal panel or polarizing plate mounting structure and a method of repairing same.

BACKGROUND OF THE INVENTION

Hitherto, there has been a device using a light source such as a metal halide lamp to enlarge and project the images of liquid crystal panels. In such conventional device, the light emitted from a light source is converged on a liquid crystal panel through a mirror or the like, and the image of the crystal liquid panel is projected on a screen through a projecting lens.

Recently, there is available a high luminance liquid crystal projector capable of projecting images on a large screen even in a bright room. For example, a light of 3000ANSI lumen can be emitted by using a liquid crystal panel of 1.3 inches in size. Also available is a micro-size projector using a small liquid crystal panel of B5 size such as 0.9 inch and 0.7 inch types.

As a method of mounting a liquid crystal panel on a liquid crystal display video projector, there is a proposal as described in the following. FIG. 6 is a perspective view of the essential parts of a conventional liquid projector. In FIG. 6, X prism 52 is located at the center of an optical portion for color synthesis. Three liquid crystal panels 50, and polarizing plate 51 disposed on each of the entrance and exit sides of respective liquid crystal panels 50 is secured on the three sides of X prism 52 by using adhesive 54 or screws via brackets 53 or the like in three directions. After that, the assembly of these parts is installed on an aluminum die-cast optical base 55. Further, a projecting lens 56 is secured on the wall of optical base 55 perpendicularly with respect to the X prism 52. After that, a fan 57 to cool the liquid crystal panel and a branch duct 58 to guide the air are assembled.

In such prior art liquid crystal display video projector, when three sheets of liquid crystal panel 50 are secured on the X prism unit, the green (G) liquid crystal panel located in the middle thereof is first secured at a predetermined position where the image comes to a focus in all directions in a generally parallel arrangement with the projecting lens. After that, the adjustment of convergence is made for the red (R) liquid crystal panel and the blue (B) liquid crystal panel before securing the panels. The projecting lens and the liquid crystal panel are individually retained by the optical base. Accordingly, the optical base will strain due to vibrations or shocks given if it falls during transportation, and as a result, there arises a problem of convergence deviation of the liquid crystal panels. Also, in such configuration, since the projecting lens is very heavy in particular, the optical base is liable to strain. And there has been a problem such that the convergence of each liquid crystal panel is liable to deviate because the liquid crystal panels are mounted on the optical base.

Further, when such liquid crystal projectors come to appear on the market and are actually used, the crystal panels and the polarizing plates have to be frequently replaced for the purpose of repair. In case of liquid crystal panels and others installed by a soldering method or the like, it is difficult to replace these liquid crystal panels and polarizing plates. Further, after replacement of these liquid crystal panels and polarizing plates, it is not easy to adjust the convergence of three liquid crystal panels of red liquid crystal panel, green liquid crystal panel and blue liquid crystal panel. Accordingly, when repairing or replacing the liquid crystal panels and polarizing plates, it is necessary to return the main body of the liquid crystal projector to the factory provided with manufacturing equipment. Thus, the users who purchase such liquid crystal projectors have to spend a lot of time for repair or replacement of these parts.

SUMMARY OF THE INVENTION

A liquid crystal display video projector of the present invention comprises:

(a) a lamp which emits light;
(b) a color separating means to separate the light into red light, blue light and green light;
(c) a plurality of liquid crystal panels to modulate each color light of the red light, the blue light and the green light,
   wherein the plurality of liquid crystal panels include
      a first liquid crystal panel to modulate the red light to a first picture element light;
      a second liquid crystal panel to modulate the blue light to a second picture element light; and
      a third liquid crystal panel to modulate the green light to a third picture element light;
(d) a polarizing plate disposed on at least one of the entrance and exit sides of each liquid crystal panel;
(e) a color synthesizing optical means to synthesize the modulated first picture element light, the second picture element light and the third picture element light into color picture image light;
(f) a projecting lens to project the synthesized color picture image light;
(g) an optical base which retains the plurality of liquid crystal panels, the polarizing plate, the color synthesizing optical means, and the projecting lens; and
(h) a main body case which accommodates the plurality of liquid crystal panels, the polarizing plate, the color separating means, the color synthesizing optical means, the optical base, and the projecting lens,
   wherein the color synthesizing optical means includes an X prism, a bonding base, and a panel adjusting member;
   the X prism synthesizes the first picture element light, the second picture element light, and the third picture element light;
   the bonding base includes an upper bonding base and a lower bonding base, the upper bonding base is disposed above the X prism, and the lower bonding base is disposed under the X prism;
   the panel adjusting member includes a first panel adjusting member to install the first liquid crystal panel, a second panel adjusting member to install the second liquid crystal panel, and a third panel adjusting member to install the third liquid crystal panel; and
   the color synthesizing optical means and the projecting lens are integrally retained by the optical base in generally parallel relation with the optical axis of the projecting lens.

Preferably, the color synthesizing optical means further includes a panel installing member.

A method of repairing a liquid crystal display video projector of the present invention comprises the configuration of the liquid crystal display video projector described above, and a method of repairing the liquid crystal display video projector comprises the steps of:

(a) removing an optical block including the projecting lens and the color synthesizing optical means from the case;

(b) at least one step of
   (i) separating the panel installing member from the panel adjusting member, and removing at least one of the plurality of liquid crystal panels and the polarizing plate from the panel installing member; and
   (ii) adjusting the position of each liquid crystal panel by moving the panel installing member via the panel adjusting member.

By the above configuration, even when shocks are given to the projector body, displacement (deflection) of the projecting lens and X prism can be prevented. Further, deviation of the convergence can be prevented with respect to the three liquid crystal panels. Also, a color synthesizing unit including a projecting lens and liquid crystal panel can be retained by a simple structure. In addition, it is very easy to repair.

BRIEF DESCRIPTION OF THE DRAWINGS

FIG. 3 is a plan view of a liquid crystal projector shown in FIG. 2(a).

FIG. 4(a) is a front view of a liquid crystal panel installing portion, and

FIG. 4(b) is a front view of a liquid crystal panel installing portion.

DESCRIPTION OF THE REFERENCE NUMERALS

Figure 1:
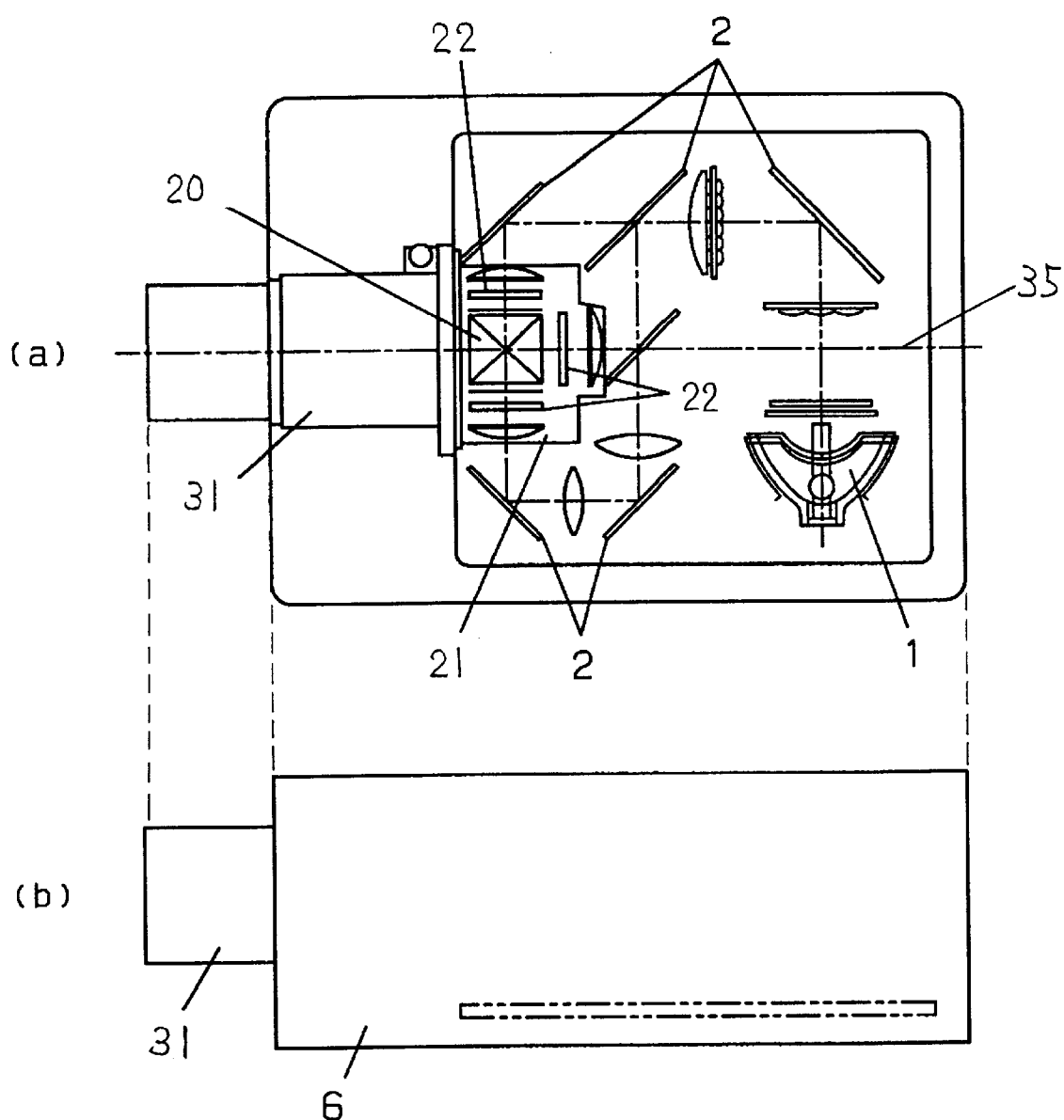
FIG. 1 includes a plan view and a front view, showing the concept of a liquid crystal display video projector in an embodiment of the present invention: (a) is a plan view, and (b) is a front view.

1 Lamp
2 Mirror
20 X prism
21 Prism base
22 Liquid crystal panel
23 Bonding base
23a Projection
24 Panel installing member
24a Lobe
24c Polarizing plate installing portion
25 First screw
26 Panel adjusting member
26a Slit opening
26b Hole portion
27 Second screw
29 Exit side polarizing plate
30 Optical base
31 Projecting lens
35 Optical axis

DETAILED DESCRIPTION OF THE INVENTION

A liquid crystal display video projector of the present invention comprises:

(a) a lamp which emits light;

(b) a color separating means to separate the light into red light, blue light and green light;

(c) a plurality of liquid crystal panels to modulate each color light of the red light, blue light and green light, wherein the plurality of liquid crystal panels include
   a first liquid crystal panel to modulate the red light to a first picture element light;
   a second liquid crystal panel to modulate the blue light to a second picture element light; and
   a third liquid crystal panel to modulate the green light to a third picture element light;

(d) a polarizing plate disposed on at least one of the entrance and exit sides of each liquid crystal panel;

(e) a color synthesizing optical means to synthesize the modulated first picture element light, second picture element light and third picture element light into color picture image light;

(f) a projecting lens to project the synthesized color picture image light;

(g) an optical base which retains the plurality of liquid crystal panels, the polarizing plate, the color synthesizing optical means, and the projecting lens; and (h) a main body case which accommodates the plurality of liquid crystal panels, the polarizing plate, the color separating means, the color synthesizing optical means, the optical base, and the projecting lens,
   wherein the color synthesizing optical means includes an X prism, a bonding base, and a panel adjusting member;
   the X prism synthesizes the first picture element light, the second picture element light, and the third picture element light;
   the bonding base includes an upper bonding base and a lower bonding base, the upper bonding base is disposed above the X prism, and the lower bonding base is disposed under the X prism;
   the panel adjusting member includes a first panel adjusting member to install the first liquid crystal panel, a second panel adjusting member to install the second liquid crystal panel, and a third panel adjusting member to install the third liquid crystal panel; and
   the color synthesizing optical means and the projecting lens are integrally retained by the optical base in generally parallel relation with the optical axis of the projecting lens.

By the above configuration, even when shocks are given to the projector body, displacement (deflection) of the projecting lens and X prism can be prevented. Further, deviation of the convergence can be prevented with respect to the three liquid crystal panels. Also, a color synthesizing unit including a projecting lens and liquid crystal panel can be retained by a simple structure. In addition, it is very easy to repair.

Preferably, the color synthesizing optical means further includes a panel installing member;
   the panel installing member comprises a first panel installing member to install the first liquid crystal panel, a second panel installing member to install the second liquid crystal panel, and a third panel installing member to install the third liquid crystal panel;

the first panel installing member is attached to the first panel adjusting member, the second panel installing member is attached to the second panel adjusting member, and the third panel installing member is attached to the third panel adjusting member;

each of the panel installing members includes a polarizing plate support and a panel installing portion;

the polarizing plate support and panel installing portion are integrally formed; and the polarizing plate is attached to the polarizing plate installing portion.

By this configuration, the polarizing plates can be firmly secured on the respective liquid crystal panels. Further, a ventilating passage for each of the liquid crystal panels and polarizing plates can be obtained to prevent heat from increasing inside the liquid crystal projector. Also, it is easy to attain the above configuration without increasing the number of parts.

Preferably, the upper bonding base has six projections, and the lower bonding base also has six projections, and these projections are nearly same in shape;

each of the panel adjusting members has hole portions;

the projections engage the hole portions, and the first panel adjusting member is fixed on the upper bonding base, the second panel adjusting member is fixed on the lower bonding base, and the third panel adjusting member is secured on the upper bonding base and the lower bonding base.

By this configuration, in case of trouble with a liquid crystal panel or polarizing plate in actual use of a liquid crystal projector, it is easy to replace the liquid crystal panel or polarizing plate without requiring any special equipment. As a result, the time required for repair of the liquid crystal projector will be greatly reduced, and it is possible to obtain a liquid crystal projector for which the liquid crystal panels can be easily replaced when necessary, thereby improving the repair efficiency and maintenance.

Preferably, the hole portion has a bore diameter larger than that of the projection;

with the position of engagement adjusted between the hole portion and the projection, the convergence of each liquid crystal panel is in a state of being adjusted;

a bonding agent secures the projection and the hole portion in engagement with each other; and thus, the installing members are respectively secured on the bonding bases.

By this configuration, the retaining members are respectively fastened to the bonding bases.

Accordingly, the repair efficiency and maintenance will be further improved.

Preferably, the bonding agent is at least one of adhesive which hardens under application of ultraviolet rays, and solder. By this configuration, the advantages described above will be further enhanced.

Preferably, each of the panel adjusting members has a slit opening; one end of the panel installing member is fastened to the panel adjusting member by using screws; the other end of the panel installing member is inserted into the slit opening of the panel adjusting member; and the panel installing member is secured to the panel adjusting member.

By this configuration, in case of trouble with a liquid crystal panel or polarizing plate in actual use of a liquid crystal projector, the liquid crystal panel or polarizing plate can be easily replaced without requiring any special equipment. As a result, the time required for repair of the liquid crystal projector will be greatly reduced, and it is possible to obtain a liquid crystal projector for which the liquid crystal panels can be easily replaced when necessary, thereby improving the repair efficiency and maintenance.

Preferably, the panel installing member has a plurality of adjusting holes in which adjusting jigs are inserted in a state of being able to slide with respect to the panel adjusting member;

with the adjusting jigs inserted in the plurality of adjusting holes, the panel adjusting member is able to move in the optical X-axis, Y-axis, Z-axis directions, and in the rotational direction.

By this configuration, in case of trouble with a liquid crystal panel or polarizing plate in actual use of a liquid crystal projector, the liquid crystal panel or polarizing plate can be easily replaced without requiring any special equipment. As a result, the time required for repair of the liquid crystal projector will be greatly reduced, and it is possible to obtain a liquid crystal projector for which the liquid crystal panels can be easily replaced when necessary, thereby improving the repair efficiency and maintenance.

Preferably, the panel installing member can be separated from the panel adjusting member. By this configuration, the advantages described above will be further enhanced.

Preferably, the panel installing member has a plurality of adjusting portions; and by operating the plurality of adjusting portions, it is possible to execute either position adjustment or removal of at least one of the plurality of liquid crystal panels and the polarizing plates.

Preferably, the color synthesizing optical means further includes a first screw;

each of the liquid crystal panels has a first screw hole;

each of the panel installing portions has a first screw portion;

the first screw fastens the first screw hole and the first screw portion, whereby the liquid crystal panels are respectively secured to the panel installing portions.

Preferably, the color synthesizing optical means further has a second screw;

each of the panel installing members has a second screw hole formed at the top end of the panel installing member and a lobe formed at the bottom end;

the panel adjusting member has a second installing portion and a slit opening;

the lobe is fitted in the slit opening, and the second screw fastens the second screw hole and the second screw portion, whereby the panel installing member is secured to the panel adjusting member.

A method of repairing a liquid crystal display video projector of the present invention comprises the configuration of the liquid crystal display.video.projector described above, and a method of repairing the liquid crystal display.video.projector comprises the steps of:

(a) removing an optical block including the projecting lens and the color synthesizing optical means from the case;

(b) at least one step of
  (i) separating the panel installing member from the panel adjusting member, and removing at least one of the liquid crystal panels and the polarizing plate from the panel installing member; and
  (ii) a step of adjusting the position of each liquid crystal panel by moving the panel installing member via the panel adjusting member.

Preferably, the step (b) includes a step of adjusting the convergence of each liquid crystal panel by operating the adjusting jigs via a plurality of adjusting portions formed in the panel adjusting member and moving the panel installing member in at least one direction selected from the group consisting of X-axis, Y-axis, Z-axis, and rotating directions.

Preferably, each of the panel installing members has a second screw hole formed at the top end of the panel installing member, and a lobe formed at the bottom end;

the panel adjusting member has a second screw portion and a slit opening;

the lobe is fitted in the slit opening, and the second screw fastens the second screw hole and the second screw portion, whereby the panel installing member is fastened to the panel adjusting member; and the step (b) (ii) includes a step of moving the panel installing member with the second screw removed or loosened.

Preferably, the color synthesizing optical means further includes a first screw;

each of the liquid crystal panels has a first screw hole;

each of the panel installing portions has a first screw portion;

the first screw fastens the first screw hole and the first screw portion, whereby the liquid crystal panels are respectively secured to the panel installing portions.

The step (b) (i) includes a step of removing the first screw to detach the liquid crystal panel.

Preferably, the method of repairing the liquid crystal projector further comprises:

(C) a step of fastening a new liquid crystal panel to the panel installing member by the first screw.

By the above configuration, even when shocks are given to the projector body, displacement (deflection) of the projecting lens and X prism can be prevented. Further, deviation of the convergence can be prevented with respect to the three liquid crystal panels. Also, a color synthesizing unit including a projecting lens and liquid crystal panel can be retained by a simple structure. In addition, it is very easy to repair.

A liquid crystal display video projector in an exemplary embodiment of the present invention will be described in the following with reference to the drawings.

Exemplary Embodiment 1

Figure 2:
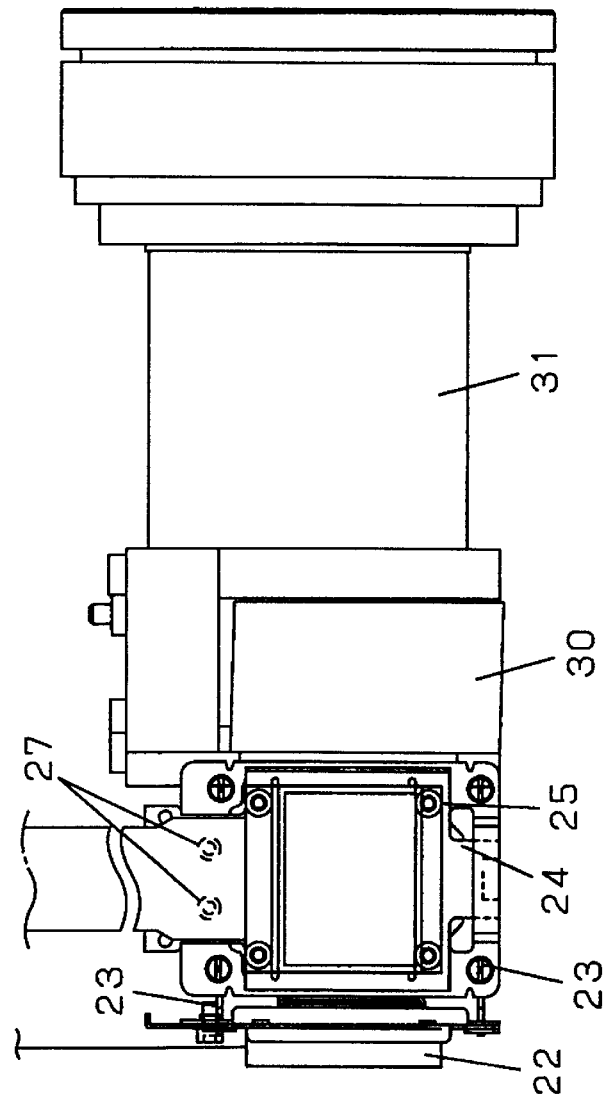
FIG. 2(a) is a front view showing the detail of a liquid crystal panel unit of a liquid crystal projector in an embodiment of the present invention.
FIG. 2(b) is a front view, partly perspective, of a liquid crystal panel unit of FIG. 2(a).
Figure 2:
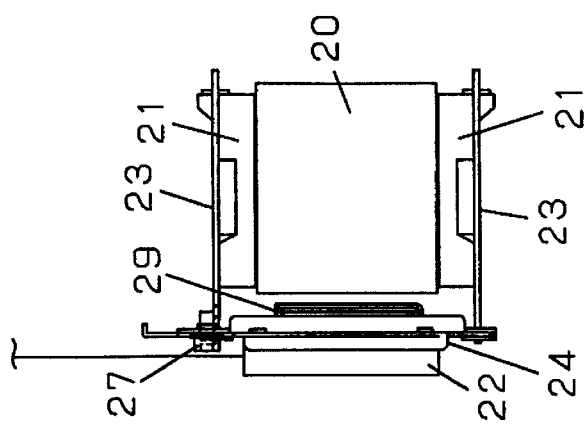
Figure 5:
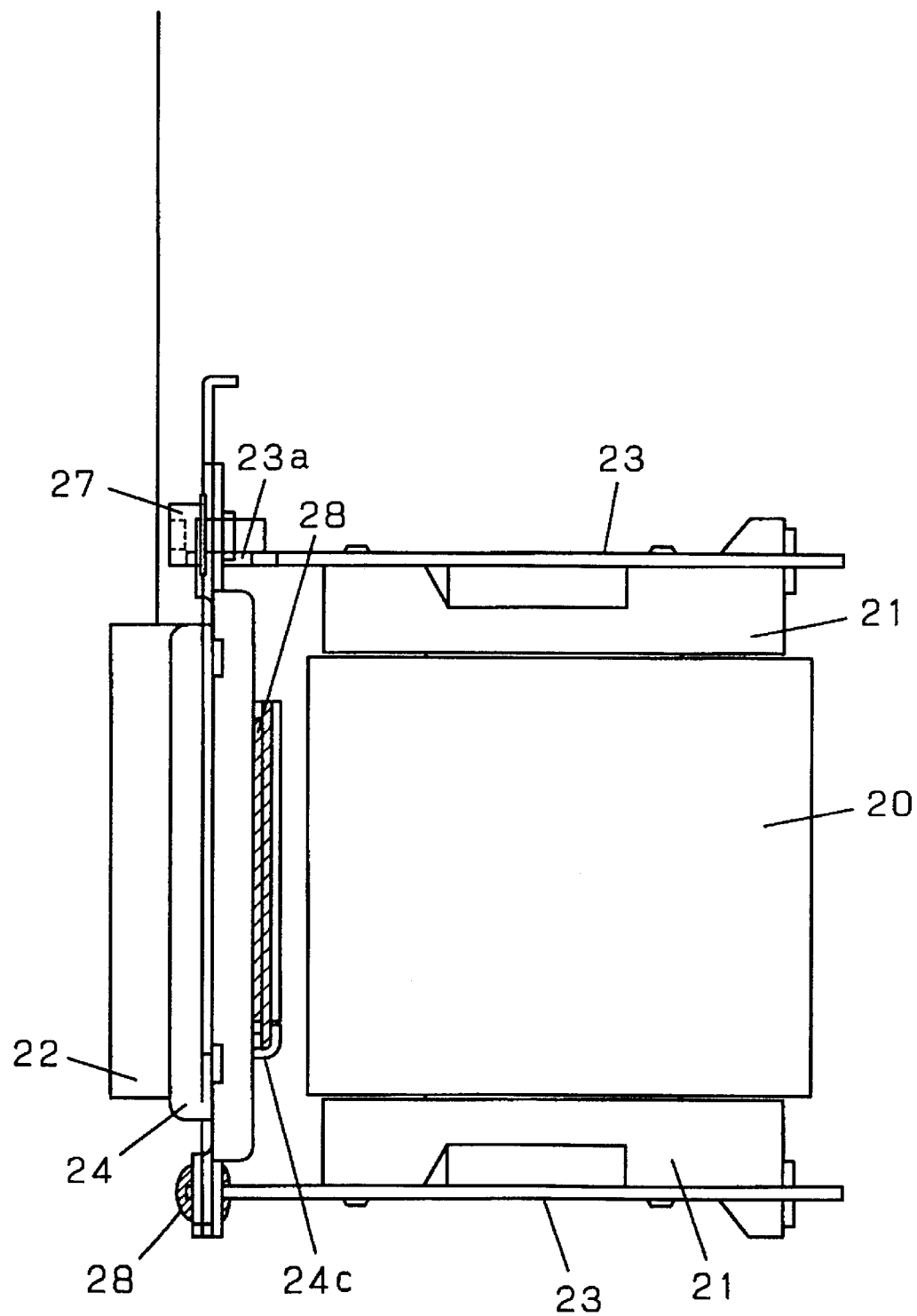
FIG. 5 is a front view, partly perspective and enlarged, of a liquid crystal projector in an embodiment of the present invention.
Figure 6:
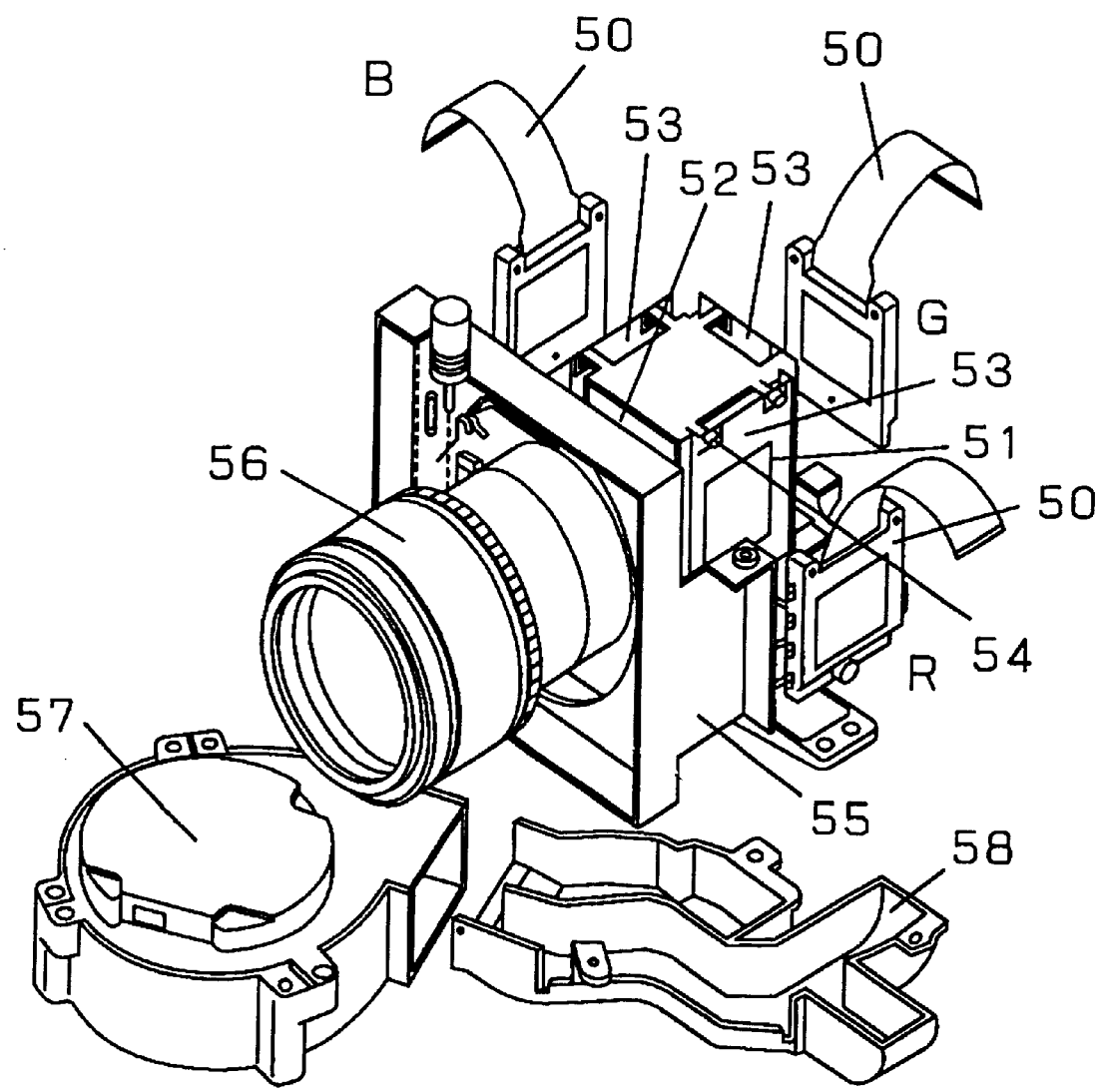
FIG. 6 is a perspective view of essential parts, showing the whole of a conventional liquid crystal projector.

FIG. 1 is a drawing showing the conceptual configuration of a liquid crystal display video projector in an exemplary embodiment of the present invention: (a) is a plan view, and (b) is a front view. FIG. 2(a) is a front view showing the detail of a liquid crystal panel unit of the liquid crystal projector of FIG. 1. FIG. 2(b) is a front view, partly perspective. FIG. 3 is a plan view of a liquid crystal panel unit of FIG. 2. FIG. 4(a) is a front view of a liquid crystal panel installing portion of the liquid crystal projector, and FIG. 4(b) is a plan view. FIG. 5 is a front view, partly perspective and enlarged, of a liquid crystal panel installing portion of FIG. 4.

The entire layout of a liquid crystal display video projector in the first exemplary embodiment will be described with reference to FIG. 1.

FIG. 1 shows a liquid crystal display video projector having an optical system using three liquid crystal panels. A liquid crystal display video projector in the present exemplary embodiment comprises a lighting block and an optical block. In the liquid crystal projector, a lamp 1, a plurality of mirrors 2, a liquid crystal panel unit, a prism base 21, X prism 20, and projecting lens 31 are installed in case 6. The lighting block includes the lamp 1 and the plurality of mirrors 2. In such liquid crystal projector, the light coming out of the lamp 1 as a light source reflects from or passes through the plurality of mirrors 2, and is decomposed into red light, green light and blue light. The respective color lights are changed into red picture element light, green picture element light and blue picture element light through the liquid crystal panel unit. The respective color picture element lights are synthesized into color picture images at the X prism 20, etc. The synthesized color picture images are enlarged and projected by the projecting lens 31. The X prism 20 and projecting lens 31 are installed on optical axis 35.

The liquid crystal panel unit includes three liquid crystal panels 22, three entrance side polarizing plates, and three exit side polarizing plates. The three liquid crystal panels 22 include a first liquid crystal panel, second liquid crystal panel, and third liquid crystal panel. The first liquid crystal panel changes the red light into red picture element light. The second liquid crystal panel changes the green light into green picture element light. The third liquid crystal panel changes the blue light into blue picture element light.

By on-off control of the electric potential of each picture element, the quantity of light such as entire white, entire black, and medium color tone can be controlled. Thus, the quantity of light is controlled for each picture element to synthesize the colors.

Next, the liquid crystal panel unit, projecting lens, and color synthesizing block will be described in detail with reference to FIG. 2(a), FIG. 2(b), FIG. 3, FIG. 4(a), FIG. 4(b), and FIG. 5.

The X prism 20 includes four triangular prisms, and R reflection film, B reflection film, and G penetration film respectively disposed on the interfaces of the prisms. Each film is formed by coating or evaporation. The triangular prism is formed of glass. The X prism 20 is disposed on upper prism base 21 and lower prism base 21. The prism base 21 is manufactured by resin molding. In this way, the X prism 20 and prism base 21 are integrally formed.

The configuration for installation of liquid crystal panels 22 in FIG. 2 and FIG. 3 are described in the following.

The upper prism base 21 is fixed on the top of X prism 20, and the lower prism base 21 is fixed on the bottom of X prism 20. Upper bonding base 23 is secured on the upper prism base 21, and lower bonding base 23 is secured on the lower prism base 21. These upper bonding base 23 and lower bonding base 23 are same in shape. Thus, the X prism 20 is secured on the bonding base 23 via the prism base 21. Each bonding base 23 has six projections 23a at positions corresponding to the three liquid crystal panels 22. That is, the upper bonding base has six projections, and the lower bonding base also has six projections, and these projections are nearly identical in shape with each other. Each panel adjusting member 26 has two hole portions 26b. These hole portions 26b are formed at positions corresponding to respective projections 23a. The hole portion 26 is larger in shape than the projection 23a with respect to the lengths at the front, rear, right and left. Each projection 23a engages the respective hole portions 26b. After the convergence of each liquid crystal panel 22 is adjusted, a bonding member such as solder or UV boding agent 28 is filled into the hole portion 26b. In this way, the first panel adjusting member is fastened to the upper bonding base, the second panel adjusting member is fastened to the lower bonding base, the third panel adjusting member is fastened to the upper and lower bonding bases. Thus, the panel adjusting members 26 are respectively secured on the upper bonding base 23 and the lower bonding base 23.

In FIG. 4(a) and FIG. 4(b), each liquid crystal panel 22 has a first screw hole (not shown), and each panel installing member 24 has a first screw portion. Four first screws 25 fasten the first screw holes and the first screw portions. In this way, each liquid crystal panel 22 is fastened to the respective panel installing members 24. The panel installing member 24 has a second screw hole (not shown) formed at the top of panel installing member 24, and a lobe 24a formed at the bottom thereof. The top of panel installing member 24 is fixed on the panel adjusting member 26 by two second screws 27. The lobe 24a formed at the bottom of panel installing member 24 engages the slit opening 26a formed in the panel adjusting member 26. In this way, the panel installing member 24 is installed on the panel adjusting member 26.

Each of the panel installing members 24 has a plurality of adjusting holes for insertion of adjusting jigs so as to be able to slide and move with respect to the panel adjusting member 26. With the adjusting jigs inserted in the plurality of adjusting holes, the panel installing member 24 is able to move in the optical X-axis, Y-axis, Z-axis directions, and in the rotational direction. That is, according to the pictures projected on the screen, the picture elements of red liquid crystal panel 22, green liquid crystal panel 22, and blue liquid crystal panel 22 are taken by a camera, and then, the positions in the 6-axis directions of the liquid crystal panel are adjusted with the movement and rotation of the X axis, Y axis, and Z axis. Thus, the convergence of each liquid crystal panel is adjusted.

In this way, each of the liquid crystal panels 22 is integrally secured on the X prism 20 by the panel adjusting member 26, upper bonding base 23, and lower bonding base 23.

Also, exit side polarizing plate 29 is fastened to exit side polarizing plate installing portion 24c formed in the panel installing member 24, spaced apart at a predetermined interval with respect to the liquid crystal panel, by using double-coated tape or adhesive. It is also possible to integrally dispose an entrance side polarizing plate (not shown) of the liquid crystal panel at the front side of each liquid crystal panel.

The upper prism base 21 and the lower prism base 21 are secured on one surface 30a of optical base 30 by using screws or the like. The X prism 20 and the liquid crystal panels 22 are secured on the optical base 30 via the prism base 21.

The projecting lens 31 is installed, in the optical axis direction of the X prism, on the other surface 30b of optical base 30 by using screws or the like. The illustration of the screw portion is omitted here.

The optical axis of projecting lens 31 is disposed in a generally parallel relation to the optical axis of X prism 20. The installing position of each liquid crystal panel 22, for example, is such that the optical axis of the green liquid crystal panel is perpendicular to the optical axis of projecting lens 31. That is, the green liquid crystal panel is disposed at the front of the X prism, the red liquid crystal panel is disposed at one side of the X prism, and the blue liquid crystal panel is disposed at the other side of the X prism. The convergence of each of the red liquid crystal panel and the blue liquid crystal panel is adjusted on the basis of the green liquid crystal panel.

In this way, each liquid crystal panel 22 is secured on the X prism 20 by the panel installing member 24, panel adjusting member 26, upper bonding base 23, and lower bonding base 23, respectively. Each of the liquid crystal panel 22 and X prism 20 is secured on the optical base 30. Further, the projecting lens 31 is secured on the optical base 30. As a result, the liquid crystal panel 22, X prism 20, and projecting lens 31 are integrally formed with each other.

As described above, the projecting lens 31, optical base 30, X prism 20, and liquid crystal panel 22 are formed into one optical block. That is, the optical block includes projecting lens 31, color synthesizing optical means, and optical base 30.

On the other hand, lamp 1 and a plurality of mirrors 2 form a lighting block. The lighting block is installed in case 6. Also, the lighting block includes the case 6. The lighting block serves a function to decompose the light coming out of the lamp 1 into three color lights.

The optical block thus formed is secured on the lighting block by using screws or the like. In this way, a liquid crystal projector is formed.

Exemplary Embodiment 2

When a liquid crystal display video projector as described in the first exemplary embodiment is actually used, the liquid crystal projector is sometimes subjected to vibrations or shocks. Even in case the liquid crystal projector is given such vibrations or shocks, deflection of the projecting lens 31 and X prism 20 will be prevented. Further, deviation of the convergence of each liquid crystal panel may be prevented with respect to the red liquid crystal panel, green liquid crystal panel, and blue liquid crystal panel. Accordingly, color dislocation can be prevented in actual use, and bright color picture images can be reliably obtained. As a result, the reliability of the liquid crystal projector will be enhanced.

A method of repairing a liquid crystal display video projector in an embodiment of the present invention comprises the configuration of the liquid crystal display video projector described above, and the following steps such as:

(a) a step of removing an optical block including the projecting lens and the color synthesizing optical means from the case; and (b) a step of separating the panel installing member from the panel adjusting member, and removing at least one of the plurality of liquid crystal panels and the polarizing plates from the panel installing member.

A method of repairing a liquid crystal projector in another embodiment of the present invention comprises:

(a) a step of removing an optical block including the projecting lens and the color synthesizing optical means from the case; and (c) a step of adjusting the position of each liquid crystal panel by moving the panel installing member via the panel adjusting member.

Preferably, the step (b) includes a step of adjusting the convergence of each liquid crystal panel by operating the adjusting jigs via a plurality of adjusting portions formed in the panel adjusting member and moving the panel installing member in at least one direction selected from the group consisting of X-axis, Y-axis, Z-axis, and rotating directions.

For the purpose of repair or maintenance of a liquid crystal panel, entrance side polarizing plate or exit side polarizing plate, after practical use of a liquid crystal projector, the optical block including the liquid crystal panel is to be removed from case 6. In that case, the optical block can be easily removed from the case 6.

When replacing a liquid crystal panel, liquid crystal panel 22 can be removed from panel installing member 24 by removing first screw 25, and a new liquid crystal panel can be installed on the panel installing member 24 by using the first screw 25.

When replacing a polarizing plate, the polarizing plate can be removed from the panel installing member 24, and a new polarizing plate can be installed on the panel installing member 24.

When adjusting the convergence of each liquid crystal panel 22, the panel installing member 24 can be easily moved by removing second screw 27. A plurality of adjusting portions are formed at the top of panel adjusting member 26. By inserting the jigs, capable of moving the panel installing member 24 in the X-, Y-, Z-axis or rotational direction, into the plurality of adjusting portions, the liquid crystal panel 22 can be easily moved to adjust the position. For example, as such adjusting jig, there is a simple adjusting jig by which each panel installing member can be moved in a state such that the panel installing member is retained by the panel adjusting member. As the plurality of adjusting portions, a plurality of adjusting holes or a plurality of adjusting projections are formed. When there are provided a plurality of adjusting holes as the plurality of adjusting portions, the adjusting jigs are inserted into the adjusting holes to move the panel installing member. Where there are provided a plurality of adjusting projections as the plurality of adjusting portions, the adjusting jigs are caught by the adjusting projections to move the panel installing member. In this way, the position of each liquid crystal panel is adjusted to make the adjustment of the convergence.

As described above, even when the liquid crystal projector is given vibrations or shocks, deviation of the convergence of each liquid crystal panel can be prevented with respect to the red liquid crystal panel, green liquid crystal panel, and blue liquid crystal panel. Further, after installation of the liquid crystal panel, and also, after practical use of the liquid crystal projector, the convergence of each liquid crystal panel can be easily adjusted with respect to the red liquid crystal panel, green liquid crystal panel, and blue liquid crystal panel. Further, for the purpose of repair or maintenance of the liquid crystal projector, these liquid crystal panels or polarizing plates can be easily replaced by using a simple jig.

What is claimed is:

1. A liquid crystal display video projector, comprising:
    (a) a lamp which emits light;
    (b) a color separating means to separate the light into red light, blue light and green light;
    (c) a plurality of crystal panels to modulate each color light of the red light, the blue light and the green light, wherein said liquid crystal panels include
        a first liquid crystal panel to modulate the red light to a first picture element light;
        a second liquid crystal panel to modulate the blue light to a second picture element light; and
        a third liquid crystal panel to modulate the green light to a third picture element light;
    (d) a polarizing plate disposed on at least one of entrance and exit sides of each of said liquid crystal panels;
    (e) a color synthesizing optical means to synthesize the modulated first picture element light, the second picture element light and the third picture element light into color picture image light;
    (f) a projecting lens to project the synthesized color picture image light;
    (g) an optical base which retains said plurality of liquid crystal panels, said polarizing plate, said color synthesizing optical means, and said projecting lens; and
    (h) a main body case which accommodates said plurality of liquid crystal panels, said polarizing plate, said color separating means, said color synthesizing optical means, said optical base, and said projecting lens,
        wherein said color synthesizing optical means includes an X prism, a bonding base, and a panel adjusting member;
        said X prism synthesizes the first picture element light, the second picture element light, and the third picture element light;
        said bonding base includes an upper bonding base and a lower bonding base, said upper bonding base is disposed above said X prism, and said lower bonding base is disposed under said X prism;
        said panel adjusting member includes a first panel adjusting member to install said first liquid crystal panel, a second panel adjusting member to install said second liquid crystal panel, and a third panel adjusting member to install said third liquid crystal panel; and
        said color synthesizing optical means and said projecting lens are integrally retained by said optical base in generally parallel relation with the optical axis of said projecting lens.

2. The liquid crystal display video projector of claim 1, wherein said color synthesizing optical means further includes a panel installing member;
said panel installing member comprises a first panel installing member to install the first liquid crystal panel, a second panel installing member to install the second liquid crystal panel, and a third panel installing member to install the third liquid crystal panel;
said first panel installing member is attached to the first panel adjusting member, said second panel installing member is attached to the second panel adjusting member, and said third panel installing member is attached to the third panel adjusting member;
each of said panel installing members includes a polarizing plate support and a panel installing portion; said polarizing plate support and panel installing portion are integrally formed;
said polarizing plate is attached to said polarizing plate installing portion; and
said liquid crystal panels are respectively secured on said panel installing portions.

3. The liquid crystal display video projector of claim 2, wherein said upper bonding base has six projections, said lower bonding base also has six projections, and these projections are nearly identical in shape;
each of said panel adjusting members has hole portions;
said projections engage said holes, and said first panel adjusting member is fixed on said upper bonding base, said second panel adjusting member is fixed on said lower bonding base, and said third panel adjusting member is secured on said upper bonding base and said lower bonding base.

4. The liquid crystal display video projector of claim 3, wherein said hole portion has a bore diameter larger than a diameter of said projection;
with the position of engagement adjusted between said hole portion and said projection, the convergence of each liquid crystal panel is in a state of being adjusted;
a bonding agent secures said projection and said hole portion in engagement with each other; and
thereby, said installing members are respectively secured on said bonding bases.

5. The liquid crystal display video projector of claim 4,
wherein said bonding agent is at least one of adhesive which hardens under application of ultraviolet rays, and solder.

6. The liquid crystal display video projector of claim 2,
wherein each of said panel adjusting members has a slit opening;
one end of said panel installing member is fastened to said panel adjusting member by using screws;
the other end of said panel installing member is inserted into said slit opening of said panel adjusting member; and
said panel installing member is secured on said panel adjusting member.

7. The liquid crystal display video projector of claim 2,
wherein said panel installing member has a plurality of adjusting holes in which adjusting jigs are inserted in a state of being able to slide with respect to said panel adjusting member; and
with said adjusting jigs inserted in said plurality of adjusting holes, said panel adjusting member is able to move in optical X-axis, Y-axis, Z-axis directions and in a rotational direction.

8. The liquid crystal display video projector of claim 2,
wherein said panel installing member is disposed separatably from said panel adjusting member.

9. The liquid crystal display video projector of claim 2,
wherein said panel installing member has a plurality of adjusting portions; and
by operating said plurality of adjusting portions, it is possible to execute either position adjustment or removal of at least one of said liquid crystal panels and polarizing plates.

10. The liquid crystal display video projector of claim 2,
wherein said color synthesizing optical means further includes a first screw;
each of said liquid crystal panels has a first screw hole;
each of said panel installing portions has a first screw portion; and
said first screw fastens the first screw hole and the first screw portion, whereby said liquid crystal panels are respectively secured on said panel installing portions.

11. The liquid crystal display video projector of claim 2,
wherein said color synthesizing optical means further has a second screw;
each of said panel installing members has a second screw hole formed at top of said panel installing member and a lobe formed at bottom thereof;
said panel adjusting member has a second installing portion and a slit opening; and
said lobe is fitted in said slit opening, and said second screw fastens the second screw hole and the second screw portion, whereby said panel installing member is secured on said panel adjusting member.

12. A method of repairing the liquid crystal display video projector of claim 2, said method comprising the steps of:
(a) removing an optical block including said projecting lens and said color synthesizing optical means from a case;
(b) at least one step of:
(i) separating said panel installing member from said panel adjusting member, and removing at least one of said plurality of liquid crystal panels and polarizing plates from said panel installing member; and
(ii) adjusting respective positions of said liquid crystal panels by moving said panel installing member via said panel adjusting member.

13. The method of repairing the liquid crystal display video projector of claim 12,
wherein said step (ii) includes a step of adjusting the convergence of each of said liquid crystal panels by operating said adjusting jigs via a plurality of adjusting portions formed in said panel adjusting member and moving said panel installing member in at least one direction selected from the group consisting of X-axis, Y-axis, Z-axis, and rotating directions.

14. The method of repairing the liquid crystal display video projector of claim 13,
wherein each of said panel installing member has a second screw hole formed at top of said panel installing member, and a lobe formed at bottom thereof;
said panel adjusting member has a second installing portion and a slit opening;
said lobe engages said slit opening, said second screw fastens said second screw hole and said second screw portion, whereby said panel installing member is secured on said panel adjusting member; and
said step (ii) includes a step of moving said panel installing member with said second screw removed or loosened.

15. The method of repairing the liquid crystal display video projector of claim 14, further comprising a step of:
(c) fastening a new liquid crystal panel to said panel installing member by using the first screw.

16. The method of repairing the liquid crystal display video projector of claim 12,
wherein said color synthesizing optical means further has a first screw;
each of said liquid crystal panels has a first screw hole;
each of said panel installing portions has a first screw portion;
said first screw fastens the first screw hole and the first screw portion, whereby said liquid crystal panels are respectively secured on said panel installing portions; and
said step (i) includes a step of removing said first screw to detach said liquid crystal panel.

* * * * *